(12) United States Patent
Kawano

(10) Patent No.: US 6,341,286 B1
(45) Date of Patent: Jan. 22, 2002

(54) METHOD AND APPARATUS FOR GENERATING AND DISTRIBUTING REPORTS

(75) Inventor: Shuro Kawano, Scarsdale, NY (US)

(73) Assignee: BSP International Corporation, New York, NY (US)

(*) Notice: Subject to any disclaimer, the term of this patent is extended or adjusted under 35 U.S.C. 154(b) by 0 days.

(21) Appl. No.: 09/179,157

(22) Filed: Oct. 26, 1998

Related U.S. Application Data
(60) Provisional application No. 60/102,451, filed on Sep. 30, 1998.

(51) Int. Cl.[7] ............................................. G06F 17/00
(52) U.S. Cl. ........................... 707/101; 707/3; 707/505
(58) Field of Search ............................. 707/1–206, 505, 707/508, 526

(56) References Cited

U.S. PATENT DOCUMENTS

| | | | | |
|---|---|---|---|---|
| 4,417,322 A | | 11/1983 | Berry et al. ................ | 364/900 |
| 4,460,975 A | | 7/1984 | Torkelsen et al. ........... | 364/900 |
| 4,831,583 A | | 5/1989 | Pascoe ....................... | 364/900 |
| 5,189,608 A | | 2/1993 | Lyons et al. ................ | 364/408 |
| 5,261,093 A | | 11/1993 | Asmuth ...................... | 395/600 |
| 5,337,406 A | | 8/1994 | Takakura et al ............ | 395/148 |
| 5,426,781 A | | 6/1995 | Kaplan et al. .............. | 395/600 |
| 5,539,903 A | | 7/1996 | Kaplan et al. .............. | 395/600 |
| 5,619,635 A | | 4/1997 | Millman et al. ............. | 395/768 |
| 5,621,873 A | | 4/1997 | Tanaka et al. .............. | 395/779 |
| 5,692,181 A | | 11/1997 | Anand et al. ............... | 395/613 |
| 5,721,903 A | * | 2/1998 | Anand et al. ................. | 707/5 |
| 5,832,504 A | * | 11/1998 | Tripathi et al. ............. | 707/104 |
| 5,870,745 A | | 5/1999 | Knutson et al. ............. | 707/101 |
| 5,945,990 A | * | 8/1999 | Morrison et al. ........... | 345/762 |
| 5,970,476 A | * | 10/1999 | Fahey ......................... | 705/28 |
| 6,119,933 A | * | 10/1999 | Wong et al. ................. | 235/380 |
| 6,055,541 A | * | 4/2000 | Solecki et al. .............. | 707/103 |
| 6,081,810 A | * | 6/2000 | Rosenzweig et al. ....... | 707/104 |
| 6,138,121 A | | 10/2000 | Costa et al. ................. | 707/100 |
| 6,160,549 A | * | 12/2000 | Touma et al. ................ | 345/762 |
| 6,226,659 B1 | * | 5/2001 | Wong et al. ................. | 707/526 |
| 6,233,583 B1 | * | 5/2001 | Hoth .......................... | 707/102 |

FOREIGN PATENT DOCUMENTS

| | | | |
|---|---|---|---|
| JP | 8-9053 | 1/1996 | ........... H04Q/7/04 |
| JP | 8-241210 | 9/1996 | ............ G06F/9/46 |
| JP | 9-26955 | 1/1997 | .......... G06F/15/20 |
| JP | 10-98606 | 4/1998 | ........... H04N/1/32 |
| JP | 10-116257 | 5/1998 | .......... G06F/15/16 |
| JP | 10-143576 | 5/1998 | .......... G06F/15/30 |

* cited by examiner

*Primary Examiner*—Maria N. Von Buhr
(74) *Attorney, Agent, or Firm*—Foley & Lardner

(57) ABSTRACT

A method and apparatus for generating and distributing computer output reports which does not require programing, does not require familiarity with database query languages, and does not require access to a database. Unattribuzed reports and attributed reports are stored in a report warehouse. Attributed reports are generated from unattributed reports and attributed reports. Exceptions in reports stored in the report warehouse are monitored and selected users are notified. The present invention is particularly suited for application in a distributed networked computer environment, for example, such as found in many businesses.

25 Claims, 11 Drawing Sheets

| EXTERNAL DEFINITIONS | |
|---|---|
| CITY | STATE |
| NEW YORK | NEW YORK |
| BUFFALO | NEW YORK |
| BRONX | NEW YORK |
| LOS ANGELES | CALIFORNIA |
| SUNNYVALE | CALIFORNIA |
| SAN FRANSISCO | CALIFORNIA |
| CHICAGO | ILLINOIS |
| SPRINGFIELD | ILLINOIS |
| | |

| EXTERNAL DEFINITIONS | |
|---|---|
| MONTH | QUARTER |
| JANUARY | 1 |
| FEBRUARY | 1 |
| MARCH | 1 |
| APRIL | 2 |
| MAY | 2 |
| JUNE | 2 |
| JULY | 3 |
| AUGUST | 3 |
| SEPTEMBER | 3 |
| OCTOBER | 4 |
| NOVEMBER | 4 |
| DECEMBER | 4 |

Fig. 10

METHOD AND APPARATUS FOR GENERATING AND DISTRIBUTING REPORTS

This application claims the benefit of U.S. provisional patent application No. 60/102,451, entitled System And Methods For Generating And Distributing Output Reports, filed on Sep. 30, 1998.

BACKGROUND OF THE INVENTION

This invention relates to methods and apparatus for generating and distributing reports and to improvements therein.

Computer reports are used to organize and display data for use by humans. Examples of computer reports are reports on sales, production, accounts receivable, accounts payable, etc. Such reports may be displayed on a computer monitor or printed out on paper and may generated at periodic intervals (e.g., daily, monthly, or yearly).

Typically, computer database management systems are employed to logically organize data stored in databases. Relational database management systems can also be used to store data in tables having columns and rows corresponding to data attributes. Examples of data attributes could include sales region, sales volume, products sold, etc.

Software applications are often used to automatically generate computer output reports from databases on a periodic basis. Such software applications are generally expensive to develop. Furthermore, routine maintenance (to respond to changes in organizational structure, changes in data attributes, etc.) can also be expensive and time consuming. Even if the software applications are maintained in a timely fashion, end users have no way to easily tailor the computer output reports to suit their own specific requirements.

At present, in order to generate a computer report based on the data stored in the database, the database user must be at least familiar with that particular database's query language. Needless to say, most users of computer reports are not familiar with any database's query language, much less all the query languages of the plurality of databases used in their workplace. Attempts have been made to providing interfaces for formulating relational database queries and producing computer reports. See, for example, Kaplan et al., U.S. Pat. No. 5,539,903, entitled "Method And Apparatus For Producing A Report From A Query To A Database Based On A Report Format," which is incorporated herein by reference. Such methods, however, require the availability of the database from which the computer report was originally generated.

A need therefore exists for a method and apparatus for generating and distributing computer output reports which does not require programing, does not require familiarity with database query languages, and does not require access to a database.

In view of the foregoing, it is an object of this invention to provide a method and apparatus for generating and distributing computer output reports which does not require programing, does not require familiarity with database query languages, and does not require access to a database.

SUMMARY OF THE INVENTION

These and other objects of the invention are accomplished in accordance with the principles of the invention by providing a method and apparatus for generating and distributing computer output reports which does not require programing, does not require familiarity with database query languages, and does not require access to a database. Unattributed reports and attributed reports are stored in a report warehouse.

Attributed reports are generated from unattributed reports and attributed reports. Exceptions in reports stored in the report warehouse are monitored and selected users are notified. As used herein, an unattributed report comprises report data and an attributed report comprises report data and report structure definitions.

The present invention is particularly suited for application in a distributed networked computer environment, for example, such as found in many businesses. In such an environment it is often desirable that databases are controlled and managed centrally. Furthermore, the number of databases in use by a particular business may be large and their query languages not easily learned. Moreover, a particular user in need of stored computer output report information may not have access to the relevant database or databases.

Unlike many databases, computer output reports often employ headings which use industry- or corporation-specific terminology, making them readily understood by users. Furthermore, computer output reports are generated at periodic intervals and represent stored "snapshots" of particular databases at particular points in time. Finally, the form of many computer output reports (e.g., certain types of accounting output reports) is determined by government regulation or industry convention.

Further features of the invention, its nature and various advantages will be more apparent from the accompanying drawings and the following detailed description of the preferred embodiments.

BRIEF DESCRIPTION OF THE DRAWINGS

FIG. 7 shown examples of external definitions used in generating a new attributed report.

FIG. 10 shows external definitions used to automatically generate new attributed reports.

DETAILED DESCRIPTION OF THE PREFERRED EMBODIMENTS

Referring to the figures, a method and apparatus for generating and distributing computer output reports which does not require programing, does not require familiarity with database query languages, and does not require access to a database is provided.

Figure 1:
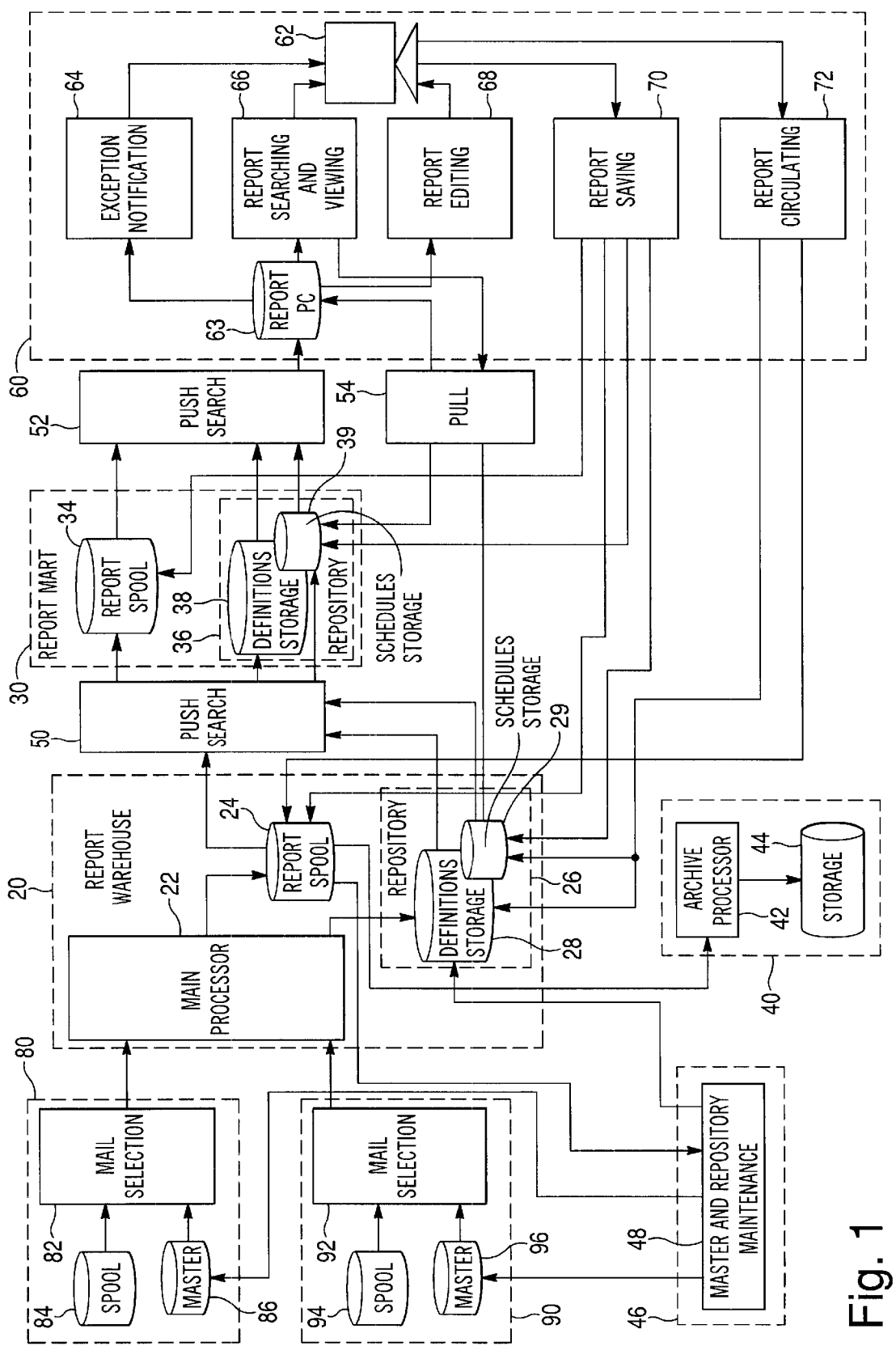
FIG. 1 Is an overview of an apparatus for generating and distributing computer output reports.

As shown in FIG. 1, unattributed reports and attributed reports are stored in report warehouse 20. Report warehouse 20 may be resident on a mainframe computer, for example. Report warehouse 20 is a centralized database which houses a collection of reports for various business groups or projects, preferably stored in chronological order. Report warehouse 20 preferably includes main processor 22. Report combination and division gives users the ability to combine and divide reports according to their needs. New reports can also be generated according to external definitions. The system preferably also includes means for generating a table of contents based on at least one attributed report. Exception discovery requires monitoring the reports stored in report warehouse 20 and occurs when pre-set conditions set forth in the exception definition (e.g., a greater than 10% drop in sales in a particular business unit, where the sales results are in a specific output report) are found. Exceptions in reports stored in the report warehouse are monitored and selected users are notified, according to exception definitions.

Report warehouse 20 also includes report spool 24 and repository 26. Report spool 24 is used for spooling report data for unattributed reports and attributed reports. Repository 26 is used for storing external definitions, exception definitions, and report structure definitions.

In addition, repository 26 preferably includes definitions storage 28 and schedules storage 29. The attributes which make up an attributed report are stored in definitions storage 28. Schedules for delivery of selected reports to selected user are stored in schedules storage 29.

Unattributed reports are typically generated by report generating systems (for example, general purpose computers running application software) and stored in spool systems. Two typical spool systems are shown in FIG. 1. A first spool system 80 (for example, A-Spool, a commercially available spool software package) preferably includes mall selection unit 82, spool 84, and master 86. Similarly, a second spool system 90 (for example, OS-Spool, a basic operation system spool) preferably includes mail selection unit 92, spool 94, and master 96. Masters 86 and 96 provide instructions as to which reports should be sent by mail selection units 82 and 92 to main processor 22. Mail selection units 82 and 92 monitor reports stored in spools 84 and 94, respectively.

Report mart 30 is a localized database which houses a collection of reports for a particular business group or a particular project team. Report mart 30 preferably includes report spool 34, and repository 36. Repository 36 preferably includes definitions storage 38 and schedules storage 39.

The system preferably includes archive 40 for backing up as well as archiving reports stored in report warehouse 20. Archive 40 preferably includes archive processor 42 for interfacing with report spool 24 and storage 44 for storing reports sent from report spool 24 to archive processor 42.

Users are preferably provided with an interface, master and repository maintenance means 46, for allowing the user to (1) control the process of converting unattributed to attributed reports, (2) access masters 86 and 96 to specify which reports should be sent by mail selection units 82 and 92 to main processor 22, and (3) specify the definitions and schedules stored in repository 26.

Attributed reports are generated from unattributed reports and attributed reports. As used herein, an unattributed report comprises only report data while an attributed report comprises report data as well as report structure definitions (i.e., information about the boundaries and position about the individual data items included in the report). In particular, computer output reports are generated by databases for display or printing in unattributed report form (i.e., as a page of alpha-numeric symbols which lacks report structure definitions).

Report warehouse 20 includes means for generating attributed reports from unattributed reports and attributed reports by identifying the report structure definitions for an unattributed report. The means for generating preferably includes a first converter for converting unattributed reports to attributed reports and a second converter for converting a first attributed report to a second attributed report. The functions of the first converter and the second converter may, for example, be incorporated in software resident on main processor 22. The process of generating attributed reports from unattributed reports and attributed reports will be discussed in reference to FIG. 5.

The system preferably also includes means for pushing (for example, push search 50 and push search 52, as shown in FIG. 1) selected reports from the report warehouse to selected users based on previously established criteria.

Individual users are provided with a terminal 60 which includes a monitor 62, a report PC 63 (for providing functionality such as localized report storage for individual users), and means for exception notification 64, means for report searching 66, means for report editing 68, means for report saving 70, and means for report circulation 72.

Figure 2:
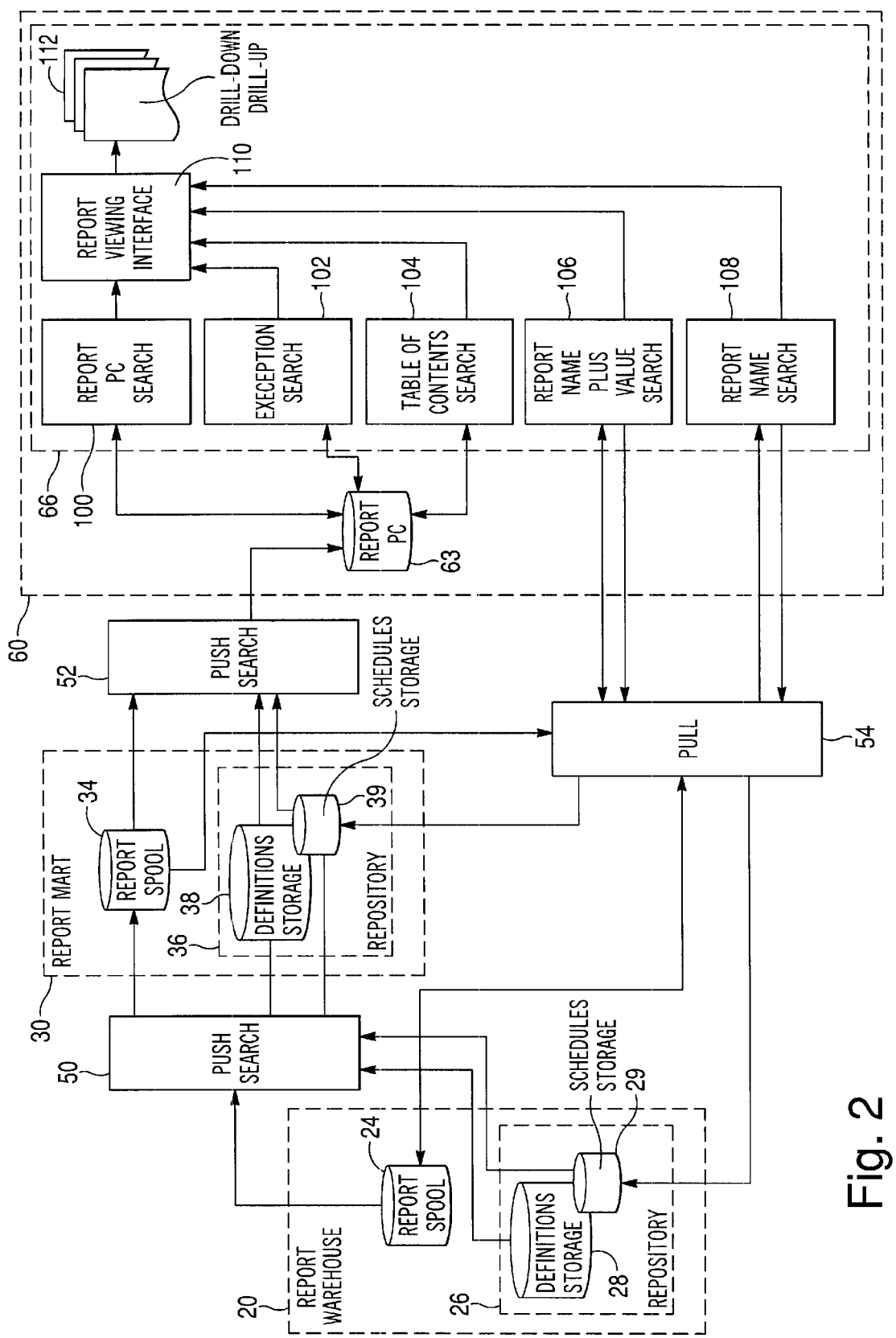
FIG. 2 shows portions of the apparatus of FIG. 1 and the user terminal in greater detail.

Terminal 60 is shown in greater detail in FIG. 2. As shown in FIG. 2, terminal 60 also includes means for report PC search 100, means for exception search 102, means for table of contents search 104, means for report name plus value search 106 and means for report name search 108. Means for report PC search 100, means for exception search 102, means for table of contents search 104, means for report name plus value search 106 and means for report name search 108 are coupled to report viewing interface 110 which is coupled to drill-down drill-up means 112. Report viewing interface 110 allows the user to view the search results on monitor 62 while either initiating a new search by inputting new search parameters or drilling-up or drilling-down through the stored reports to the desired output report.

The system preferably also includes pull means 54 for pulling reports which preferably comprises means to search report warehouse 20 or report mart 30 for unattributed reports and attributed reports, thereby generating search results and means to download the report data corresponding to the search results to terminal 60. In addition, pull means 54 may include means to display the search results.

The system preferably also includes drill-down and drill up means 112. Drilling-down allows the user to move from higher-level attributed reports which are summaries and combinations of other attributed reports to more detailed, lower-level attributed reports until the original unattributed report(s) is reached. Drilling-up through attributed reports allows the user to move from more detailed, lower-level attributed (or unattributed) reports to higher level attributed reports.

Figure 3:
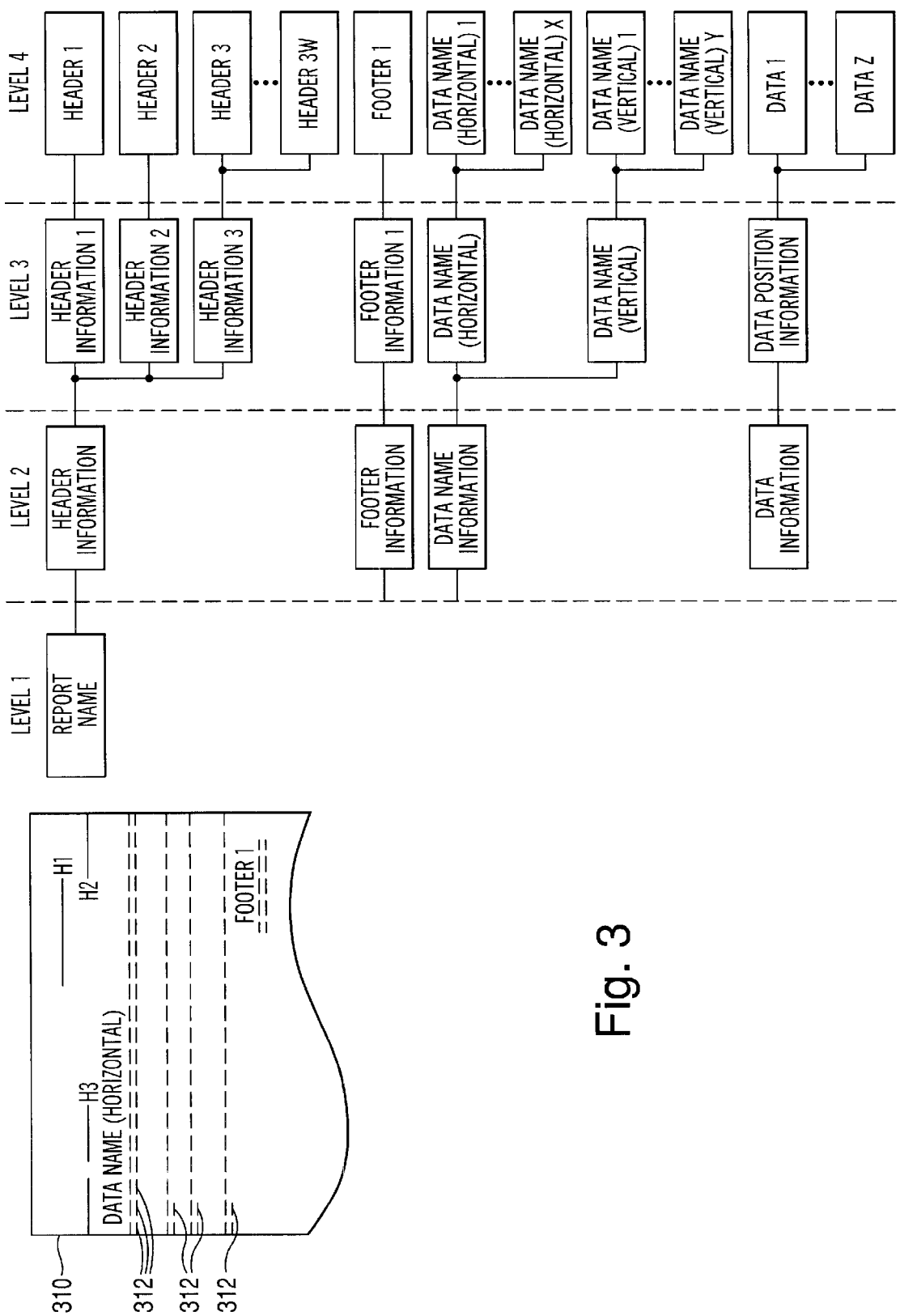
FIG. 3 shows a data structure for a typical output report.

The structure of a typical report (for example report 310) is shown in FIG. 3.

Figure 4:
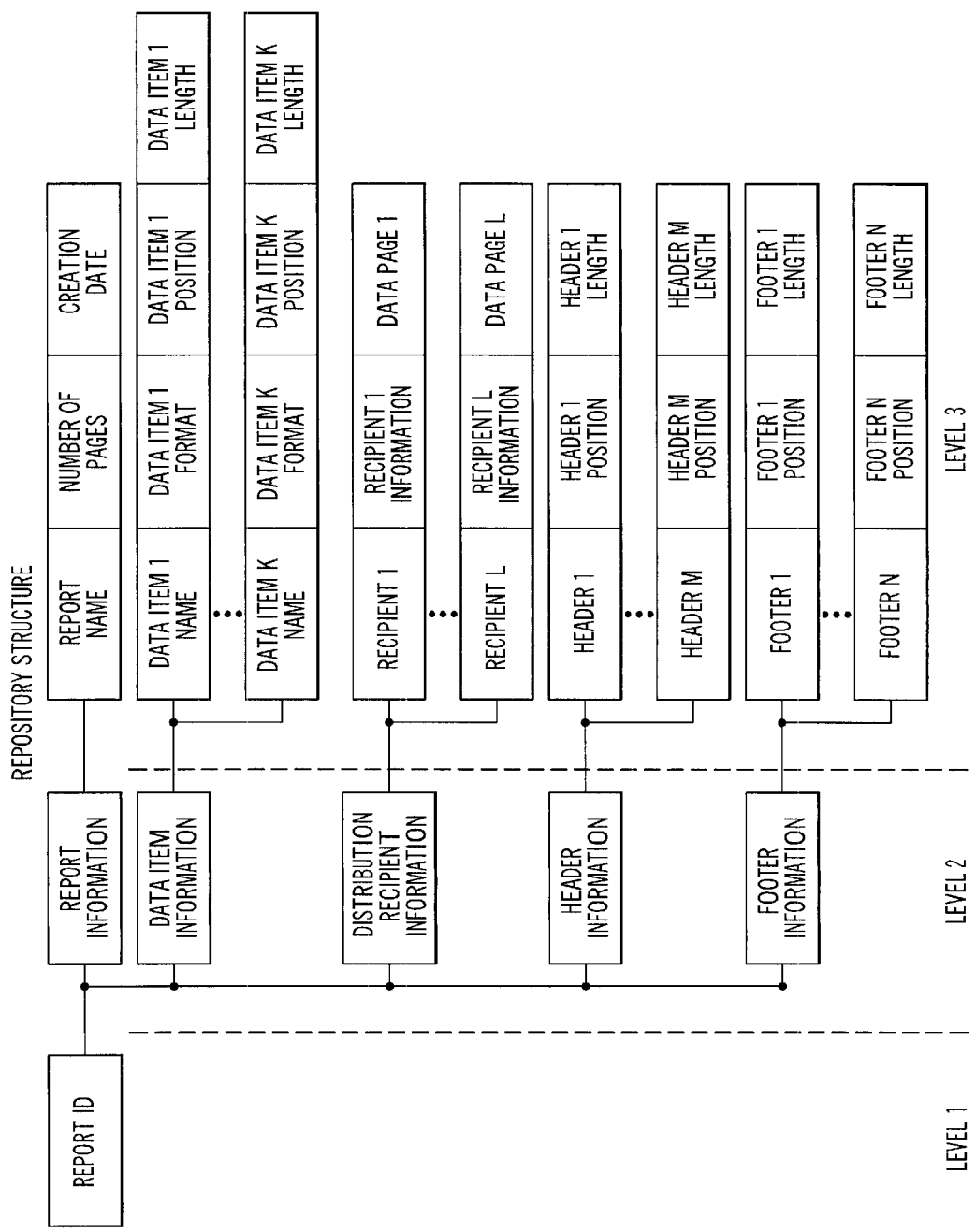
FIG. 4 shows a preferred data structure for use storing the definitions of attributed reports.

A preferred data structure for use in storing the definitions of attributed reports in repository 26 is shown in FIG. 4. A report ID is stored at a first level. Report information, data item information, distribution recipient information, header information, and footer information are stored at a second level.

Figure 5:
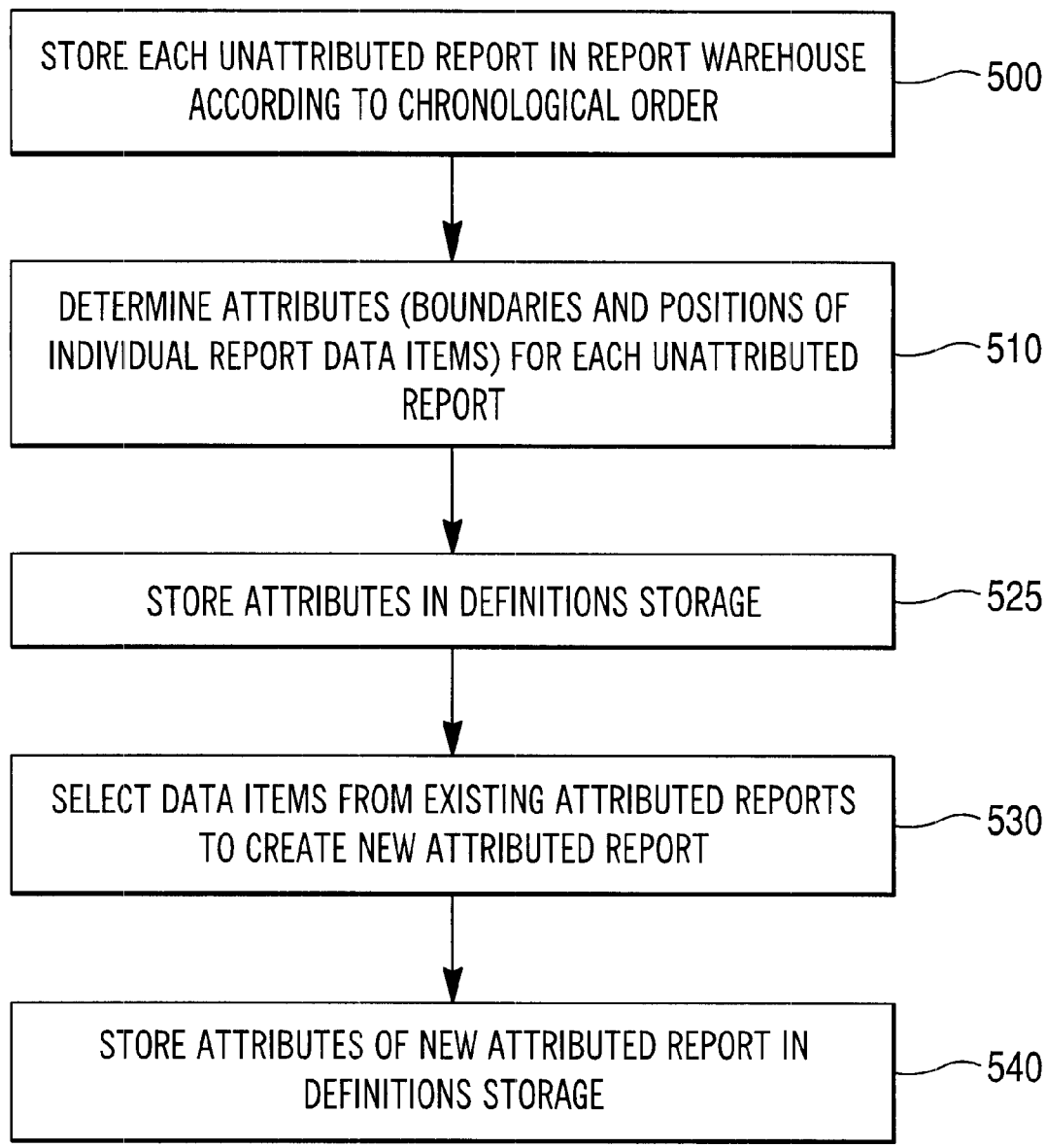
FIG. 5 is a flowchart illustrating the process of generating attributed reports from unattributed reports and attributed reports.

As shown in FIG. 5, the process of generating attributed reports from unattributed reports begins with storing an unattributed report in report warehouse 20 according to chronological order, as shown in step 500. Then, the attributes (i.e., the boundaries and positions of individual report data items) of the report are determined, as shown in step 510. The determination of attributes of step 510 is preferably done automatically, however, depending on the amenability of the original unattributed report to automatic determination, some or all of the attributes may need to be determined manually. These attributes, which define an attributed report, are then stored in definitions storage 28, as shown in step 525. Steps 500, 510, and 525 are preferably performed by main processor 22 when a report is sent from mail selection unit 82 or 92 to main processor 22.

Existing attributed reports can be joined or divided, as shown in steps 530 and 540, by selecting data items from existing attributed reports and storing the attributes of the new attributed report in definitions storage 28. The attributes preferably also include report relation definitions which facilitate drill-down and drill-up. Steps 530 and 540 are preferably performed by any of report warehouse 20, report mart 30 or report PC 63.

The system preferably also includes means for generating a new attributed report from one or more attributed reports stored in report warehouse 28 based on external definitions stored in definitions storage 28. For example, a business strategist might wish to focus on the sales results for a particular region at monthly intervals for a period of several years but attributed reports stored in report warehouse 28 are all maintained on a daily basis. In such case, the system generates a new attributed report with monthly sales results for the selected region over the selected period of years based on attributed reports stored in report warehouse 28 using the external definitions stored in definitions storage 28.

Exception monitoring can be used along with report generation based on external definitions to generate a report with specific data fields drawn from a plurality of reports when a particular exception is detected. The newly generated report can then be sent to selected users.

Figure 6:
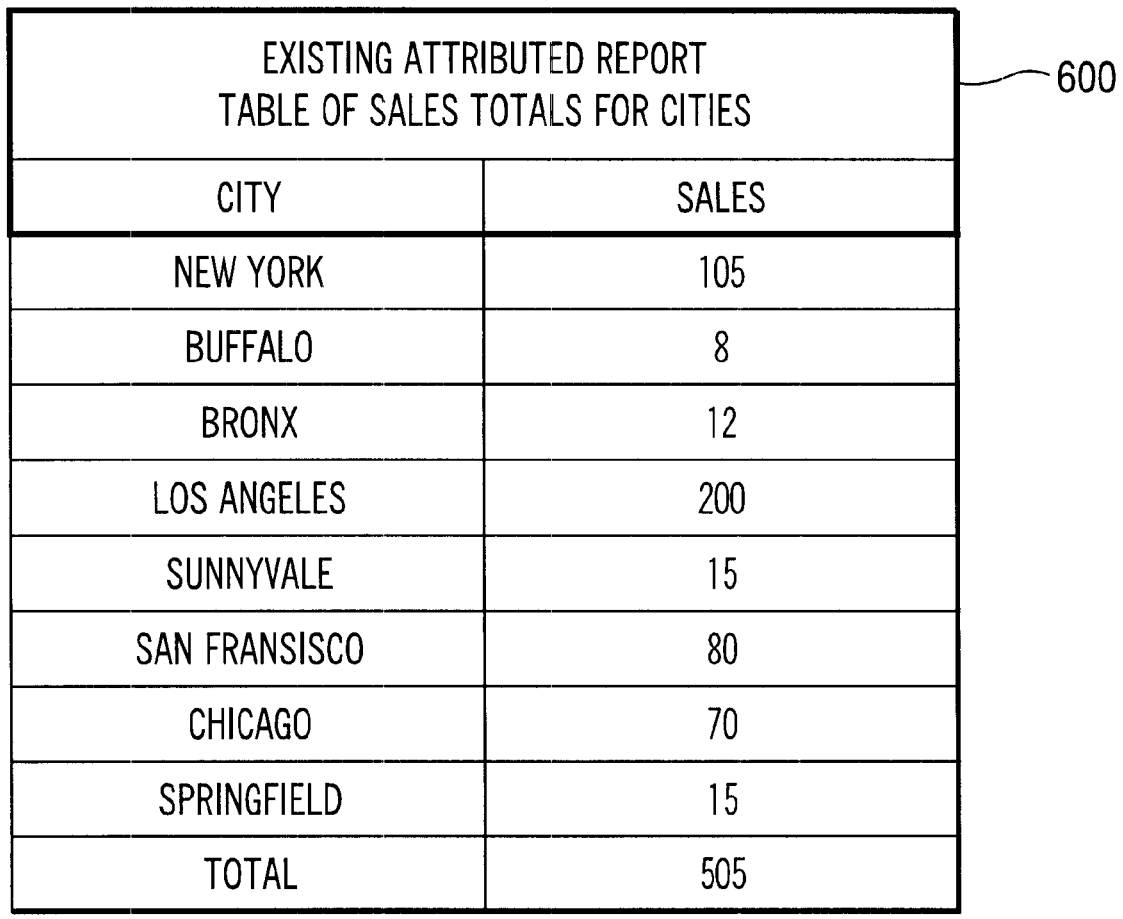
FIG. 6 shows an example of an existing attributed report.
Figure 8:
FIG. 8 shows an example of a new attributed report generated from the existing report of FIG. 6 based on the external definitions of FIG. 7.

An example of an existing attributed report 600 (specifically a table of sales totals for cities) is shown in FIG. 6. As shown with reference to FIG. 7, the external definitions provide the mapping such that existing attributed report 600 can be used to automatically generate a new attributed report 800 (as shown in FIG. 8) with sales totals based on a state-by-state basis (rather than on a city-by-city basis).

In addition, sub-totals and totals for the newly generated attributed report can be automatically generated by taking into account data field boundaries (usually control breaks). As shown in FIG. 8, the total for the attributed report 800 is 505.

Figure 9:
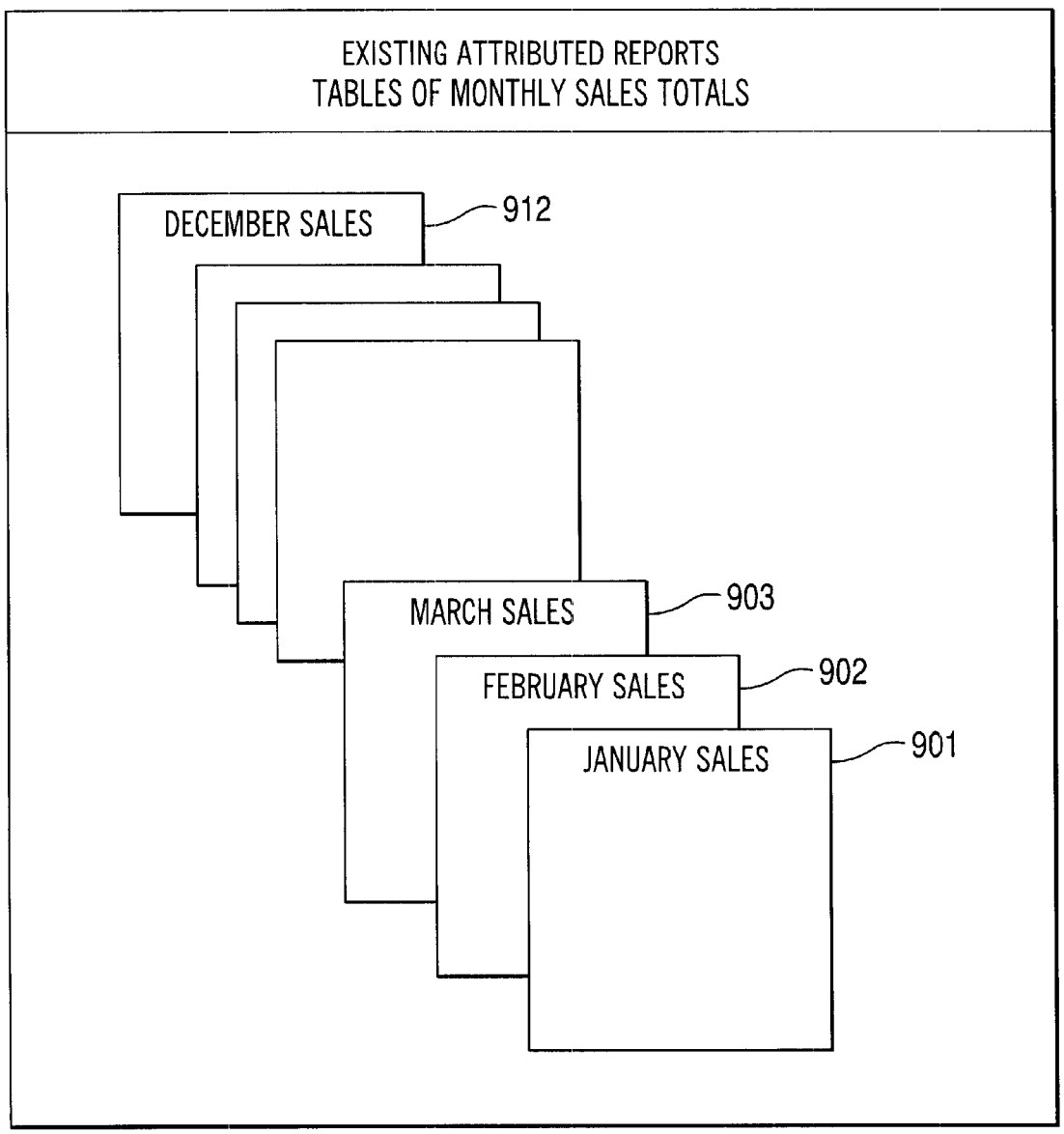
FIG. 9 shows another example of existing attributed reports.
Figure 11:
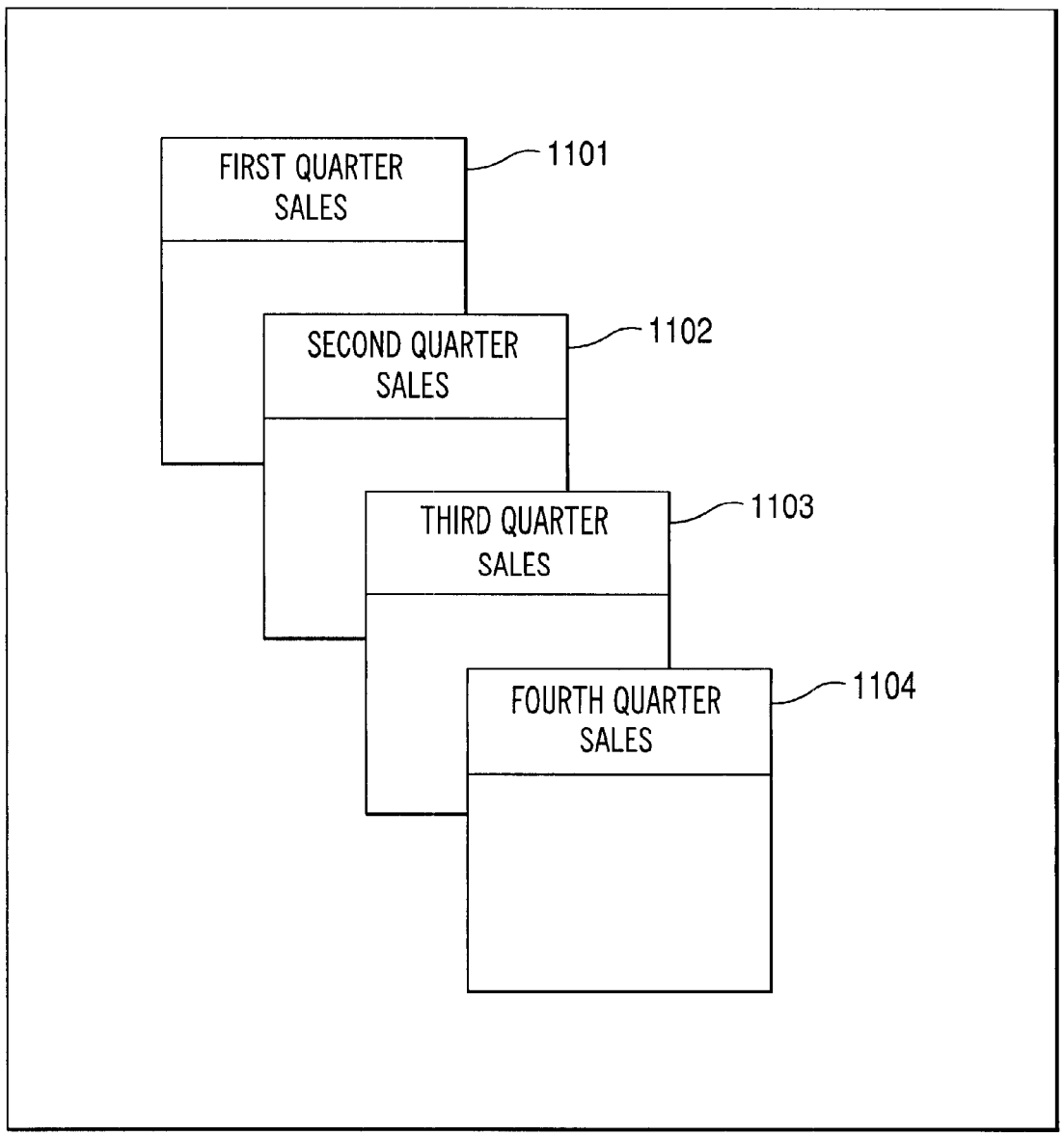
FIG. 11 shows newly generated attributed reports generated from the existing reports of FIG. 9 based on the external definitions of FIG. 10.

Another example of existing attributed reports 901–912 (specifically a table of monthly sales totals for the months January to December) is shown in FIG. 9. As shown with reference to FIG. 10, the external definitions provide the mapping such that existing attributed reports 901–912 can be used to automatically generate new attributed reports 1101–1104 (as shown in FIG. 11) with sales totals based on a quarter-by-quarter basis (rather than on a month-by-month basis).

It will be understood that the foregoing is only illustrative of the principles of this invention, and that various modifications can be made by those skilled in the art without departing from the scope and spirit of the invention. For example, the various data structures mentioned herein are preferred, but other data structures can be used if desired.

What is claimed is:

1. A system for generating and distributing reports, wherein an unattributed report comprises report data, and wherein an attributed report comprises report data and report structure definitions, the system comprising:
    a report warehouse for storing unattributed reports and attributed reports, wherein report data is generated from a database for printing or display and lacks any report structure definitions; and
    means for generating attributed reports from unattributed reports and/or attributed reports.

2. The system of claim 1 wherein the means for generating includes:
    means for monitoring an exception in a report stored in the report warehouse and notifying a selected user.

3. The system of claim 1 wherein the means for generating includes:
    a first converter for converting one unattributed report to a first attributed report; and
    a second converter for converting the first attributed report to a second attributed report based on a criteria.

4. The system of claim 1 further including:
    means for pushing selected reports from the report warehouse to selected users.

5. The system of claim 1 further including:
    means for combining attributed reports stored in the report warehouse; and
    means for dividing attributed reports stored in the report warehouse.

6. The system of claim 1 further including:
    means for generating a new attributed report from an existing attributed report based on external definitions.

7. The system of claim 1 further including:
    means for generating a table of contents based on at least one attributed report stored in the report warehouse; and
    means to pull reports which comprises means to search the report warehouse for unattributed reports and attributed reports based on the table of contents.

8. The system of claim 1 wherein the report warehouse includes:
    a report spool for spooling report data for unattributed reports and attributed reports; and
    a repository for storing external definitions, exception definitions, and report structure definitions.

9. The system of claim 1 further including:
    a first converter for converting one unattributed report to a first attributed report;
    a second converter for converting the first attributed report to a second attributed report;
    a means for pushing selected reports from the report warehouse to selected users; and
    a repository for storing external definitions, exception definitions, report structure definitions, and schedules for executing the first and second report converters and the means for pushing.

10. The system of claim 1 further including:
    means for combining attributed reports stored in the report warehouse;
    means for dividing attributed reports stored in the report warehouse; and
    a repository for storing external definitions, exception definitions, report structure definitions, and information for combining and dividing attributed reports.

11. The system of claim 1 further including
means to drill-down to more detailed reports based on report relation definitions; and
means to drill-up through attributed reports based on report relation definitions.

12. The system of claim 1 further including:
means to pull reports.

13. The system of claim 1 further including:
means to pull reports which comprises means to search the report warehouse for unattributed reports and attributed reports.

14. A method for generating and distributing reports, wherein an unattributed report comprises report data and wherein an attributed report comprises report data and report structure definitions, the method comprising:
storing unattributed reports and attributed reports in a report warehouse, wherein report data is generated from a database for printing or display and lacks any report structure definitions; and
generating attributed reports from unattributed reports and/or attributed reports.

15. The method of claim 14 further including:
monitoring an exception in a report stored in a report warehouse; and
notifying a selected user of the occurrence of the exception.

16. The method of claim 14 further including;
converting one unattributed report to a first attributed report; and
converting the first attributed report to a second attributed report.

17. The method of claim 14 further including:
pushing selected reports from the report warehouse to selected users.

18. The method of claim 14 further including:
combining attributed reports stored in the report warehouse; and
dividing attributed reports stored in the report warehouse.

19. The method of claim 14 further including:
generating an attributed report based on external definitions.

20. The method of claim 14 further including:
converting one unattributed report to a first attributed report;
converting the first attributed report to a second attributed report;
pushing selected reports from the report warehouse to selected users; and
storing external definitions, exception definitions, report structure definitions, schedules for executing the first and second report converters, and means for pushing in a repository.

21. A system for generating and distributing reports, wherein an unattributed report comprises report data, and wherein an attributed report comprises report data and report structure definitions, the system comprising:
a report warehouse for storing unattributed reports and attributed reports, wherein report data is generated from a database for printing or display and lacks any report structure definitions; and
a first converter that generates attributed reports from unattributed reports.

22. A computer readable medium having program code stored thereon that is executable by a computer for generating and distributing reports, wherein an unattributed report comprises report data and wherein an attributed report comprises report data and report structure definition, the program code causing the computer to perform the following method steps:
storing unattributed reports and attributed reports in a report warehouse, wherein report data is generated from a database for printing or display and lack any report structure definitions; and
generating attributed reports from unattributed reports and/or attributed reports.

23. The computer readable medium according to claim 22, wherein the step of generating attributed reports comprises:
converting one unattributed report to a first attributed report; and
converting the first attributed report to a second attributed report.

24. The computer readable medium according to claim 22, wherein the generating step generates an attributed report based on external definitions.

25. The computer readable medium according to claim 23, further comprising storing external definitions, exception definitions, report structure definitions, schedules for executing the converting steps, and means for pushing reports, in a repository.

* * * * *